Aug. 17, 1937.                    W. LEATHERS                    2,090,453
                       COVERED FILTER FOR VACUUM CLEANERS
                              Filed Feb. 24, 1936
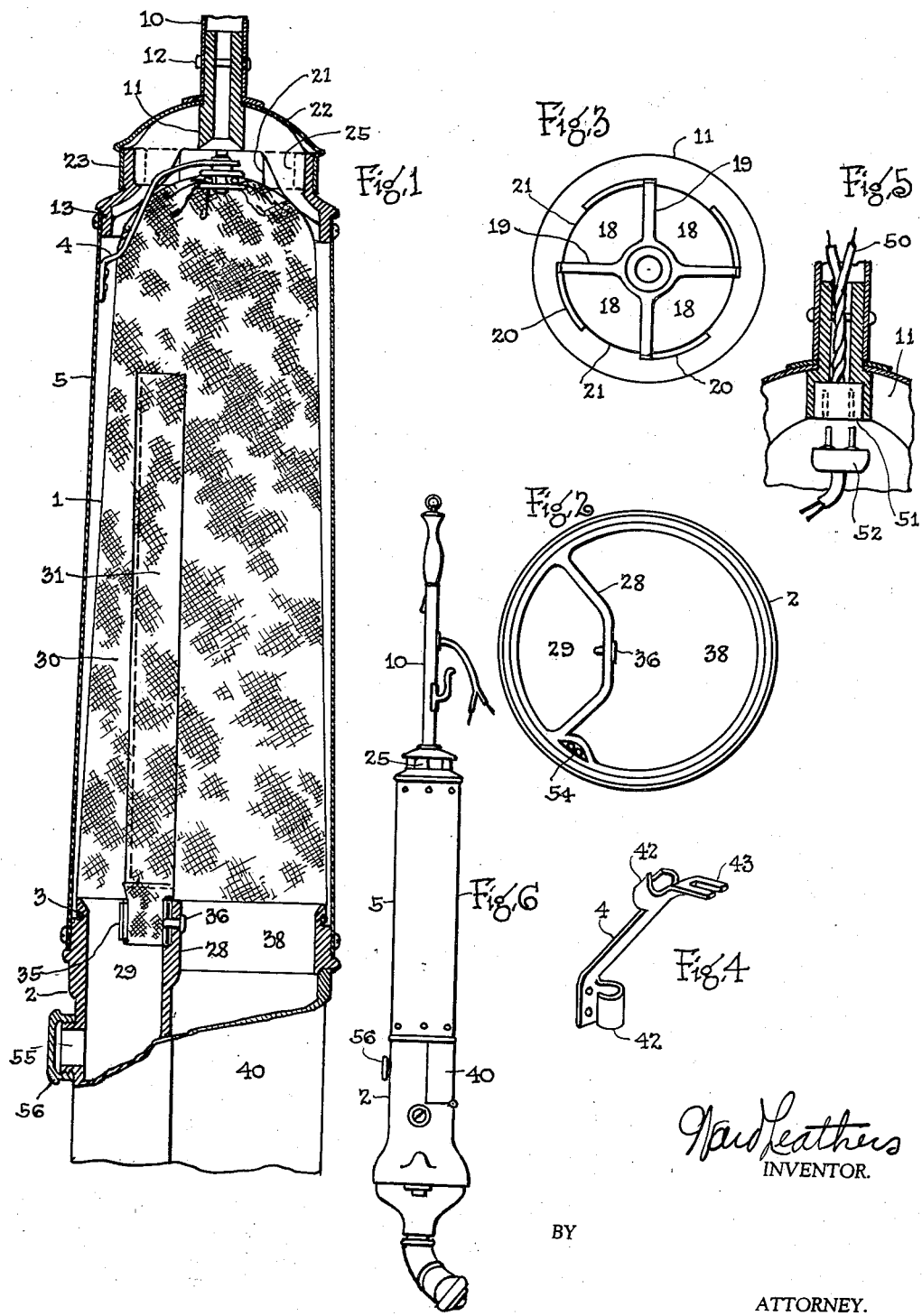

Patented Aug. 17, 1937

2,090,453

UNITED STATES PATENT OFFICE 2,090,453

COVERED FILTER FOR VACUUM CLEANERS

Ward Leathers, Haworth, N. J., assignor to Quadrex Corporation, New York, N. Y., a corporation of Delaware Application February 24, 1936, Serial No. 65,397

3 Claims. (Cl. 183—51)

The general object of my invention is to produce an improved, light-weight, suction cleaning device for vacuum cleaner purposes. It refers especially to the type of vacuum cleaner having a motor-suction-unit rigid with the handle thereof. It has to do particularly with the making of a filter and solid cover therefor, without a handle passing through the filter.

This specification is a continuation in part of that set forth in my application for Letters Patent, Serial No. 713,347, filed February 28, 1934.

My many Letters Patent granted and applications pending pertaining to the type of motor-suction cleaner above mentioned, indicate the many advantages of the present invention which houses the filter free from service contact with the user, makes the filter accessible in case of stoppage, or for other reasons, and provides more free space for the flow of dirt laden air downward through the filter.

The present invention is best expressed as a substantially concentrically arranged vacuum cleaner unit wherein the filter, immediately above the dirt receptacle, is concentric with the motor axis and the handle and wherein the case, or cover, for said filter carries the structural support from handle member to motor-suction-unit. The present invention has to do with the arrangement of the parts for such filter construction as will enable simple and practical assembly, simple disassembly, and other practical requisites which serve the purpose of the type of cleaner to which the above mentioned Letters Patent pertain, as well as the above recited advantages. A further object is to provide means for supplying from the cleaner, clean air under pressure for blowing, spraying and the like, as is common in vacuum cleaner practice. There is a fundamental difference between my suction cleaner as herein described without a handle passing through the filter, and the one disclosed in my co-pending application for Letters Patent No. 65,398, February 24th, 1936, which has a handle passing through the filter.

In order to set forth my invention so that those familiar with these arts may understand, I have prepared this specification and appended drawing herewith, of which:—

Figure 1 shows a cross-section of the filter and cover mechanism.

Figure 2 is a plan view of the lower filter-and-cover holder.

Figure 3 is a plan view of the upper filter-cover-holder.

Figure 4 is a structural detail.

Figure 5 is a cross-section of an electrical joint at the top of the filter-cover.

Figure 6 is a side view of the type of cleaner to which these structures may more suitably be applied.

A filter of porous material 1, Figure 1, is substantially cylindrical and joined to a filter holder 2 by means of wire, welt or other suitable fastening 3. Filter holder 2 is shown as an integral part of the motor housing (see Figure 6). The filter is gathered together at the top in any suitable manner and joined to a bracket 4 for purposes of top support. The bracket is firmly attached to a thin walled, substantially cylindrical, filter cover 5. The filter cover may suitably be made of hard sheet aluminum, or more preferably of hard fibre, since it should have the following characteristics: light weight, thin section, stiffness and flexibility; the latter being for the purpose of avoiding denting. This cover may be firmly joined to the motor housing, or upward extension thereof, in any suitable manner, as by screws or clamp ring. A handle 10 may be suitably or firmly joined to a solid top member 11, such as a die-casting, as by a rivet 12. This casting is provided with a cylindrical portion 13 to which the filter cover 1 is firmly joined in manner similar to its juncture at the bottom, or in other suitable manner. The casting 11 has an upper lug or stem for juncture with the handle, and has openings 18 through it separated by wings 19 (see Figure 3). A rim 20 has interruptions 21 therein at suitable intervals. A freely turnable cap 22 is disposed over the casting 11 when the handle is assembled thereto. The cylindrical side walls 23 of the cap 22 fit smoothly but loosely over the rim 20, and have therein slots or ports 25 (shown in dotted lines). These ports register with the openings in the rim 20 at 21. By turning the free moving cap 22 all of the ports through the casting and cap may be made to open or close simultaneously. The object of this valve is to permit, or resist, the flow of air through the filter when the motor-suction-unit is in operation. The lower filter holder 2 (see Figure 2) is provided with a partition 28. The chamber 29 is for the up-flow of dirt laden air. It communicates with an inner tube 30 formed by sewing a piece of fabric 31 to the walls of the filter 1. This piece of fabric (half of which is shown) is held in place at the bottom by means of a horseshoe shaped spring 35 passed through a hem in the material. A hole in the center of said spring engages a pin 36 in the partition 28. Another opening 38 through the filter holder 2 permits the free flow of dirt downward into the dirt receptacle 40.

The bracket 4 may be provided with cord holders 42 and a fork 43 to which the top of the filter is removably attached for purposes of disassembly.

The electrical conductors 50, Figure 5, passing through the handle 10 and the casting 11 may be supplied with an electrical socket 51. Into this socket an electrical plug 52 may be plugged. From this plug the conductors may lead downward to the motor between the filter and the case. They may be held in the cord holders 42 and pass through the filter holder 2 as at 54.

In case of stoppage or a desire to service the filter, the filter case may be released from the casting 11 (at 13). The handle assembly with casting 11 attached may be removed by disconnecting the plug 52 from its socket. The filter may also be released from its holder in the bracket 4, the filter cover released from its attachment at the bottom to the filter holder 2, and the filter cover removed without disturbing the filter attachments at the bottom.

Referring to Figure 1, in the motor-housing, filter-holding part 2 there may be an opening 55 in communication with the air chamber 29. This port may be closed as by a screw cap 56. Where a stream of clean air under pressure is desired, the porting mechanism at the top of the filter may be closed and a hose or other connection made at the port 55. To reverse the operation, remove the hose or connection, replace the cap 56 which may be threaded, hinged on or otherwise joined, open the ports at the top and the machine is ready for normal cleaning purposes.

Having set forth my invention in a form reduced to mechanical practice, it should be understood that there are other types of construction familiar to those versed in these arts which accomplish the same purposes without departing from the spirit of my invention.

I claim:

1. In a vacuum cleaner, a motor-suction-unit, a dirt receptacle, a substantially cylindrical filter disposed above said dirt receptacle, a conveying duct for dirt-laden air leading from said motor-suction-unit to the bottom of said filter, a second fabric duct joined to the side of said filter leading to a point near the top of the filter, a solid cover surrounding said filter, a solid cap firmly joined to the top of said cover, a handle firmly joined to said cap, and with no handle passing through said filter, with all the above recited elements substantially annular and concentric, and with exhaust ports in the top of said cover annularly disposed and closable by a manually rotatable valve port.

2. In a vacuum cleaner, a motor-suction-unit, a dirt receptacle, a substantially cylindrical filter disposed above said dirt-receptacle, a conveying duct for dirt-laden air leading from said motor-blower-unit to the bottom of said filter and having means of joining a functioning air-blowing hose thereto, a solid cover surrounding said filter, a solid cap joined to the top of said cover, a handle joined to said cap and manually closable exhaust ports in said cover, said named means and said exhaust ports reciprocally functionable.

3. In a vacuum cleaner, a motor-suction-unit, an up-draught dirt-laden air conduit and a dirt-receptacle comprising together a substantially annular form, a filtering sleeve surrounded by a substantially cylindrical non-porous cover, a solid cap joined rigidly to said cover, a handle joined rigidly to said cap, all the above recited elements substantially annular, concentric and co-axial, a flexible air duct joined to the inner wall of said filtering sleeve, communicating at its bottom end with said up-draught air duct and with its upper end disposed near the top of said filtering sleeve, and a manually closable port disposed below said secondary flexible duct from which compressed air may be exhausted before it reaches the filter.

WARD LEATHERS.